US011835966B2

(12) United States Patent
Fukunaga et al.

(10) Patent No.: US 11,835,966 B2
(45) Date of Patent: Dec. 5, 2023

(54) SERVICE SYSTEM USING AUTONOMOUS DRIVING

(71) Applicant: TOYOTA JIDOSHA KABUSHIKI KAISHA, Aichi-ken (JP)

(72) Inventors: Keima Fukunaga, Tokyo (JP); Tomohito Matsuoka, Nagoya (JP); Seiichi Tsunoda, Nisshin (JP); Jiro Goto, Seto (JP); Yasutaka Etou, Okazaki (JP); Terumi Ukai, Toyokawa (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 587 days.

(21) Appl. No.: 17/037,702

(22) Filed: Sep. 30, 2020

(65) Prior Publication Data

US 2021/0116940 A1    Apr. 22, 2021

(30) Foreign Application Priority Data

Oct. 16, 2019  (JP) .................................. 2019-189113

(51) Int. Cl.
| | |
|---|---|
| *G01C 22/00* | (2006.01) |
| *G05D 1/02* | (2020.01) |
| *G06Q 10/0631* | (2023.01) |
| *G06Q 10/0835* | (2023.01) |

(52) U.S. Cl.
CPC ..... *G05D 1/0297* (2013.01); *G06Q 10/06316* (2013.01); *G06Q 10/063114* (2013.01); *G06Q 10/0835* (2013.01)

(58) Field of Classification Search
CPC ........ G05D 1/0297; G06Q 10/063114; G06Q 10/06316; G06Q 10/0835
See application file for complete search history.

(56) References Cited

U.S. PATENT DOCUMENTS

| 10,222,798 B1* | 3/2019 | Brady ................ G06Q 10/0832 |
| 2019/0122560 A1 | 4/2019 | Goto et al. |
| 2019/0317526 A1* | 10/2019 | Goldman ............... G06Q 10/02 |

FOREIGN PATENT DOCUMENTS

| CN | 104851035 A | 8/2015 |
| JP | 201979125 A | 5/2019 |
| KR | 1020100049433 A | 5/2010 |

* cited by examiner

*Primary Examiner* — Adam M Alharbi
(74) *Attorney, Agent, or Firm* — Hauptman Ham, LLP (57) ABSTRACT

A service system includes a common server and multiple vehicles in communication with the common server to travel autonomously. Each vehicle performs tasks of multiple entities by cooperating with the common server. The common server includes an operating status database in which an operating status of each vehicle and a primary entity which has priority to use all or part of the vehicles are associated with each other. When one of the vehicles finishes a task of the primary entity, the common server determines whether the vehicle can perform another task of an entity other than the primary entity by checking the operating status database, and if determining so, performs the task of the other entity by cooperating with the vehicle.

4 Claims, 6 Drawing Sheets

FIG. 1

OPERATING STATUS DATA   PRESENT TIME: 9:50

| VEHICLE NO. | PRIMARY ENTITY | TASK IDENTIFICATION | TASK PROGRESS | TASK START TIME | TASK FINISH TIME |
|---|---|---|---|---|---|
| m 1 | COMPANY A | DELIVERY 101 | DELIVERY IN PROGRESS | 9:00 | 10:00 |
| m 2 | COMPANY A | DELIVERY 102 | COLLECTION IN PROGRESS | 9:30 | 10:30 |
| m 3 | COMPANY A | DELIVERY 103 | | 10:00 | 12:00 |
| m 1 | COMPANY A | DELIVERY 104 | | 11:00 | 12:00 |
| . . . . . | . . . . . | . . . . . | . . . . . | . . . . . | . . . . . |
| m n | COMPANY A | DELIVERY 10n | FINISH | 9:00 | 9:50 |

SPOT TASK PROGRESS DATA  PRESENT TIME: 9:50

| VEHICLE NO. | ENTITY | SPOT TASK IDENTIFICATION | PROGRESS | TASK START TIME | TASK FINISH TIME |
|---|---|---|---|---|---|
| m 9 | COMPANY B | SHOPPING 101 | FINISH | 9:05 | 9:20 |
| m 7 | COMPANY C | PICKUP/DROP OFF 101 | PICKUP/DROP OFF IN PROGRESS | 9:35 | 10:10 |
|  | COMPANY B | SHOPPING 102 |  | 10:05 | 10:20 |
|  | COMPANY C | PICKUP/DROP OFF 102 |  | 10:35 | 11:30 |
|  | COMPANY B | SHOPPING 103 |  | 12:05 | 12:30 |
| ... | ... | ... | ... | ... | ... |

//  # SERVICE SYSTEM USING AUTONOMOUS DRIVING

CROSS REFERENCE TO RELATED APPLICATION

This application claims priority to Japanese Patent Application No. 2019-189113 filed on Oct. 16, 2019, which is incorporated herein by reference in its entirety including the specification, claims, drawings, and abstract.

TECHNICAL FIELD

The present disclosure relates to a service system configured to perform services of multiple entities (such as business or governmental organizations) using multiple autonomously-driven vehicles.

BACKGROUND

In recent years, autonomous driving technologies have been rapidly developed, suggesting various services using autonomously-driven vehicles. JP 2019-79125A discloses a system to allocate autonomously-driven vehicles.

SUMMARY

The vehicle allocation system disclosed in JP 2019-79125A can allocate vehicles for a single business to transfer passengers to destinations using autonomously-driven vehicles. However, this disclosure does not consider allocation of a single vehicle to perform tasks of multiple businesses. In order to efficiently operate vehicles, there is room for improvement.

An object of the present disclosure is to improve a vehicle operation efficiency in a service system using multiple vehicles.

A service system according to an embodiment of the present disclosure includes a common server which includes a map information database storing map data, and multiple vehicles in communication with the common server to travel autonomously. Each vehicle performs tasks of multiple entities by cooperating with the common server. The common server further includes an operating status database in which an operating status of each vehicle and a primary entity which has priority to use all or part of the vehicles are associated with each other. When one of the vehicles finishes a task of the primary entity, the common server determines whether the vehicle can perform another task of an entity other than the primary entity by checking the operating status database, and if determining so, performs the task of the other entity by cooperating with the vehicle.

The operation efficiency of vehicles can be improved because multiple vehicles can be allocated to perform tasks of different services as described above.

In a service system according to an embodiment of the present disclosure, when the one of the vehicles finishes the task of the primary entity, the common server may determine whether the vehicle can perform another task of the other entity by comparing a spare time duration allowed before a next task of the primary entity and a required time duration to perform the other task of the other entity.

The operation efficiency of vehicles can be improved without interfering with the service of the primary entity.

In a service system according to an embodiment of the present disclosure, the common server may further include a building database that stores indoor data of a building. The vehicles may autonomously travel inside and outside the building based on the indoor data of the building and the map data received from the common server.

A vehicle may deliver a package or the like from one location inside a building to a destination inside another building via outside without interruption ("one-through" operation).

In a service system according to an embodiment of the present disclosure, the entities other than the primary entity may provide services different from that of the primary entity.

As it is possible to allocate vehicles for tasks of tasks of multiple entities that provide different services, the operation efficiency of vehicles can be improved.

The present disclosure can improve the operation efficiency of vehicles in a service system using multiple vehicles.

BRIEF DESCRIPTION OF DRAWINGS

Embodiments of the present disclosure will be described based on the following figures, wherein.

DESCRIPTION OF EMBODIMENTS

Figure 1:
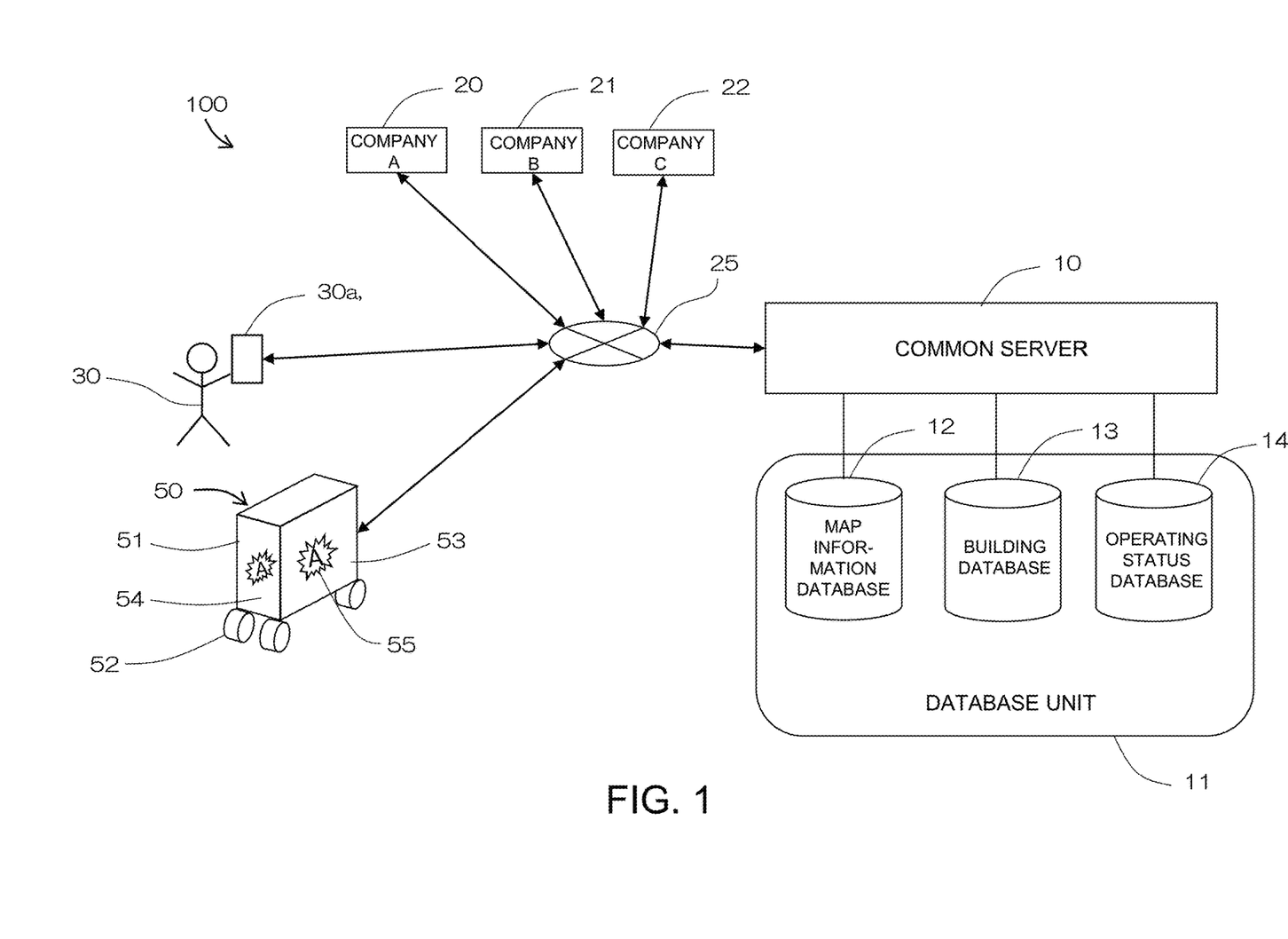
FIG. 1 is a diagram showing a configuration of a service system according to an embodiment of the present disclosure.

A service system 100 according to an embodiment of the present disclosure is described below with reference to the attached drawings. As shown in FIG. 1, the service system 100 is configured with a common server 10 and multiple vehicles 50 which cooperate with the common server 10 to perform tasks of multiple entities; namely, a company A 20, a company B 21, and a company C 22. The company A 20 is the primary entity which has priority to use some or all of the vehicles 50 to provide its service. The company B 21 and the company C 22 are other entities which provide services different from that of the company A 20. In the description below, the company A 20 is assumed to provide a package delivery service, whereas the company B 21 and the company C 22 are other companies which provide housekeeping services, such as shopping and child pickup/drop off. It should be noted that FIG. 1 shows only one of the vehicles 50.

The vehicle 50 shown in FIG. 1 is an autonomously-driven electric vehicle which includes a vehicle body 51 and motor-driven wheels 52. The vehicle body 51 includes a package container into which packages can be loaded, batteries to drive the motor-driven wheels 52, an electric-power controller, a communication unit which communicates information to/from the common server 10, and a drive controller which controls the vehicles 50 to travel autonomously in accordance with information received from the common server 10. The drive controller is configured with a computer which includes a processor, such as a CPU, for processing information, and a memory. The vehicle body 51 includes displays on external surfaces; namely, side surfaces 53 and front and rear surfaces 54 such that a logo 55 of the entity or advertisements can be displayed on these surfaces while the vehicle 50 is performing a task by cooperating with the common server 10. FIG. 1 shows the vehicle 50 which displays a logo mark of the company A 20 which is the primary entity. The vehicle 50 may have audio functions to communicate with people.

In FIG. 1, a user 30 uses the package delivery service of the company A 20, and housekeeping services of the company B 21 and the company C 22. The user 30 has a mobile terminal 30a which transmits positional information using GPS or other system. The positional information transmitted from the mobile terminal 30a is sent to the common server 10 via the Internet 25.

The common server 10 is a computer which includes a processor, such as a CPU, for processing data, and a memory. A database unit 11 including a map information database 12, a building database 13, and an operating status database 14 is connected to the common server 10.

The map information database 12 stores map data such as a road and building layout in regions where the vehicles 50 travel. The building database 13 stores indoor data of buildings in the regions where the vehicle 50 travel, including building floor layout, locations of vertical transportation facilities, such as elevators and escalators, and locations of fixtures and partitions on each floor. The building database 13 may be, for example, a combination of building information molding (BIM) data of the building and scanned data of indoor status of the building.

Figure 2:
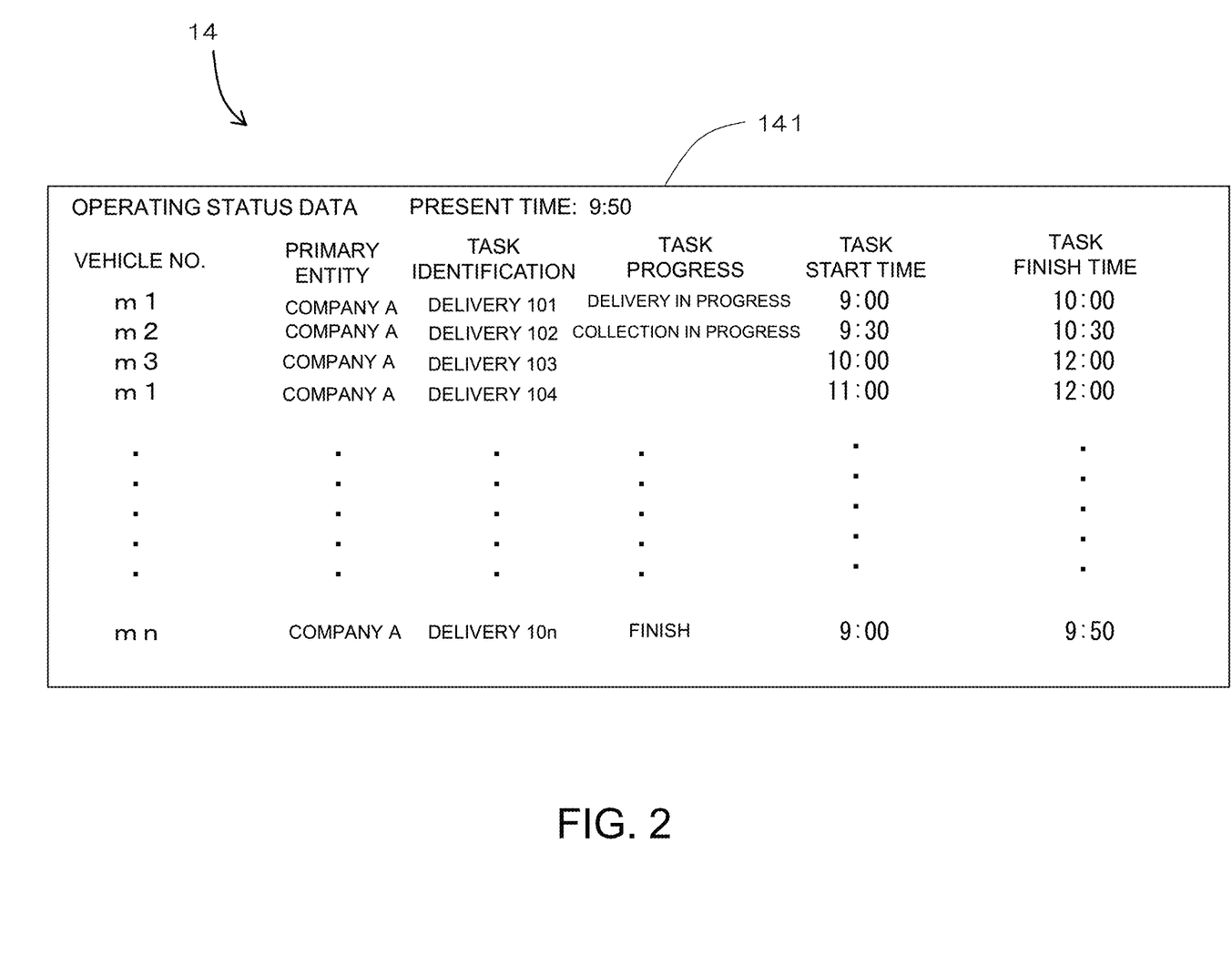
FIG. 2 is a diagram showing operating status data stored in an operating status database of the service system according to FIG. 1.
Figure 3:
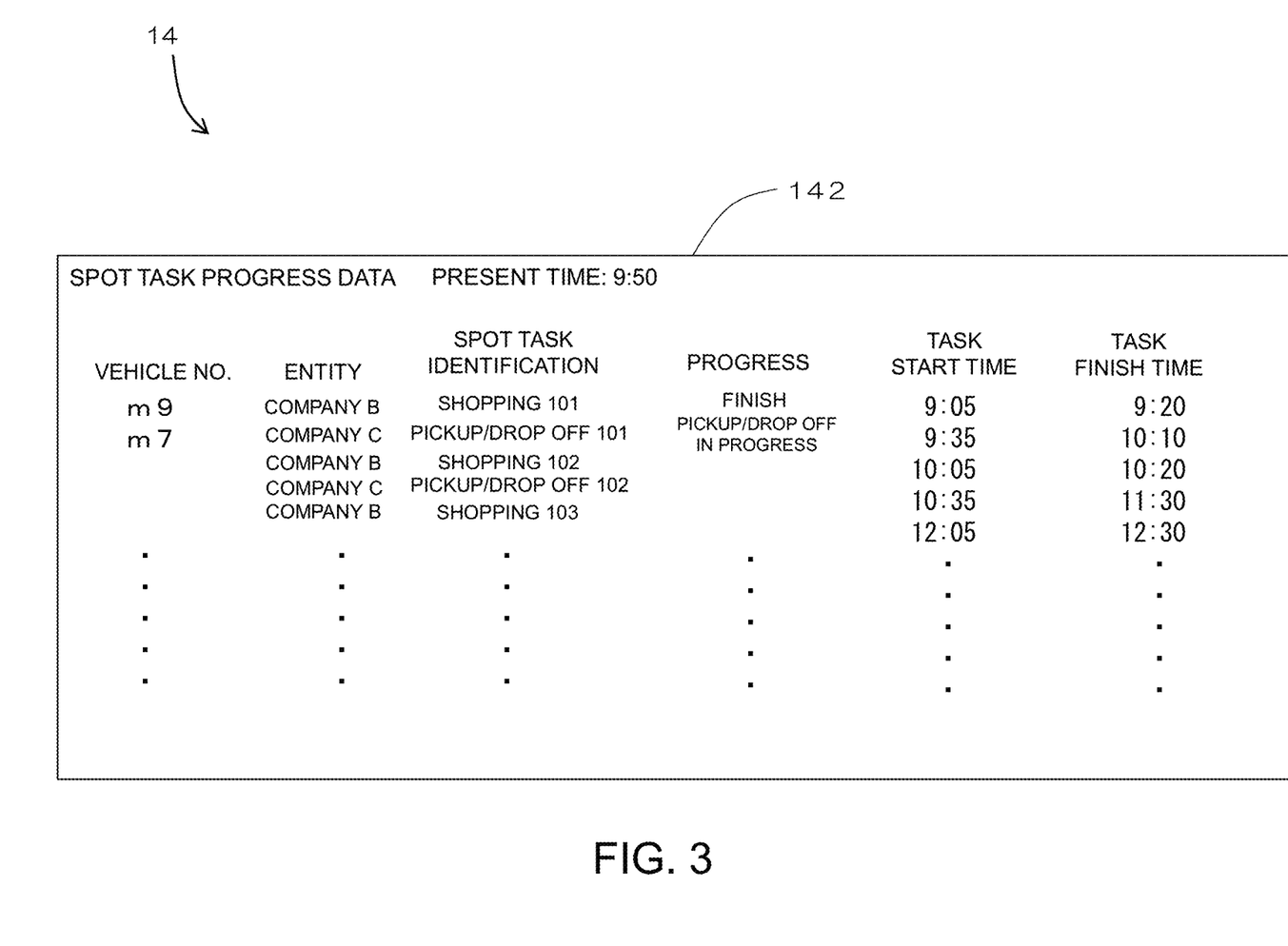
FIG. 3 is a diagram showing a spot task progress data stored in the operating status database of the service system according to FIG. 1.

As shown in FIGS. 2 and 3, the operating status database 14 includes operating status data 141 and spot task progress data 142.

As shown in FIG. 2, the operating status data 141 is a set of data showing the operating status of the vehicles 50, which the company A 20 (the primary entity) has priority to use. The operating status data 141 stores a set of the following data which are associated with each other: the present time; the vehicle number of the vehicle 50; the name of the primary entity which has priority to use the vehicle 50; task identification; task progress; task start time; and task finish time. Before the start of a task, the task start time indicates the time at which the task is scheduled to be started, whereas, after the start of the task, the task start time indicates the time at which the task actually started. Similarly, while the task is in progress, the task finish time indicates the time at which the task is scheduled to be finished, whereas, after the finish of the task, the task finish time indicates the time at which the task actually finished. Further, after the finish of the task, the progress column indicates that the task has been finished, whereas, while the vehicle 50 is at stand-by, the progress column is left blank.

As shown in FIG. 2, the company A 20 (the primary entity) has priority to use n number of vehicles 50, which are numbered from "m1" to "mn". In the description below, the vehicles 50 having vehicle numbers "m1" to "mn" are referred to "vehicle m1" to "vehicle mn". The company A 20 provides a package delivery service using the vehicle m1 to vehicle mn. Assuming that the present time is 9:50, the operating status data 141 stores data which indicates that, for example, the vehicle m1 is performing a delivery task 101 and currently on the way to a delivery destination, and further that the delivery task 101 by the vehicle m1 was started at 9:00, and is currently in progress and scheduled to be finished at 10:00. The operating status data 141 also stores data which indicates that the vehicle m2 is performing a package collection of a delivery task 102 which was started at 9:30 and is scheduled to be finished at 10:30; and further that the vehicle m3 is at stand-by for a delivery task 103 which is scheduled to be started at 10:00 and finished at 12:00. The operating status data 141 further stores data which indicates that after finishing the delivery task 101, the vehicle m1 is scheduled to perform a delivery task 104 which is scheduled to be started at 11:00.

As shown in FIG. 3, the spot task progress data 142 is a current data set which indicates spot task requests from the company B 21 and the company C 22, which are other entities, as well as the progress of the spot tasks. The spot task progress data 142 stores the following data which are associated with each other: the present time; the vehicle number of each of the vehicles 50; the name of the company using the spot task of the vehicle 50; task identification; task progress; task start time; and task finish time. When the company B 21 and the company C 22 enter requests for spot tasks, data are stored in corresponding columns of the company name, the identification of the spot task, the task start time, and the task finish time. At this stage, the task start time and the task finish time store data respectively indicating scheduled task start time and scheduled task finish time. The vehicle number column and the task progress column are left blank.

When the spot task request is accepted, the number of the vehicle which is allocated for the spot task is stored. After the start of the spot task, the progress of the task, such as pickup/drop off service in progress or shopping in progress, is stored. When the spot task is finished, "finish" is stored in the progress column, with the time at which the task was actually finished being stored in the task finish time.

As shown in FIG. 3, assuming that the present time is 9:50, the spot task progress data 142 shows that a shopping task 101 requested by the company B 21 was started at 9:05 and finished at 9:20, and further that a pickup/drop off task which was started at 9:35 and is scheduled to be finished at 10:10 is in progress. The other registered tasks are a shopping task 102 requested by the company B 21 scheduled to be started at 10:05 and finished at 10:20; a pickup/drop off task 102 requested by the company C 22 scheduled to be started at 10:35 and finished at 11:30; and a shopping task 103 requested by the company B 21 scheduled to be started at 12:05 and finished at 12:30.

Figure 4:
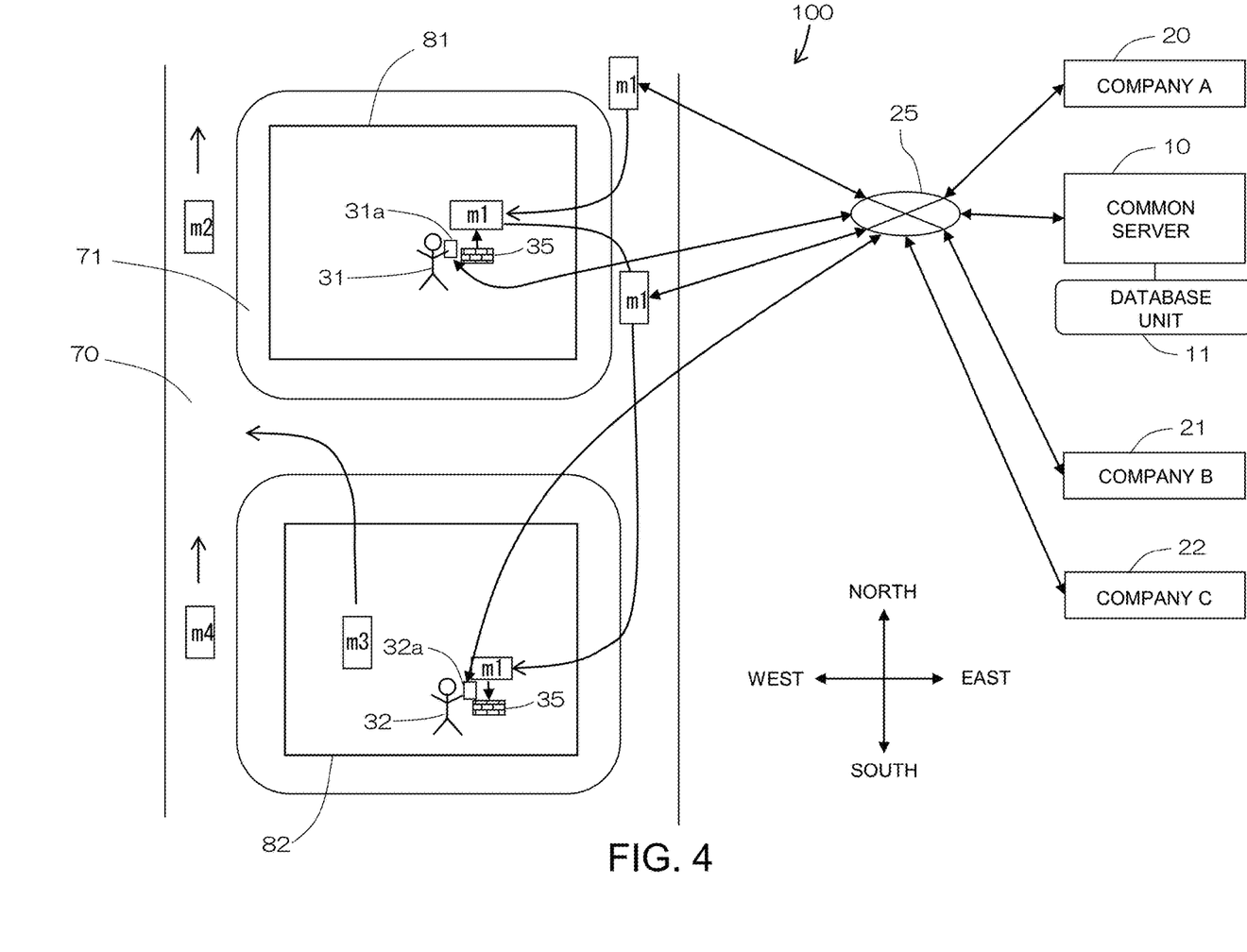
FIG. 4 is a schematic view showing delivery tasks of a primary entity in progress in the service system shown in FIG. 1.

With reference to FIGS. 2 and 4, operations are described in which the vehicles 50 cooperating with the common server perform tasks of the delivery service for the company A 20 (the primary entity). In FIG. 4 and related descriptions below, up is north; down is south; right is east; and left is west.

As shown in FIG. 4, multiple buildings including buildings 81, 82 are located in an area managed by the common server 10. The vehicles m1 to mn perform delivery tasks in this area. A roadway 70 and a sidewalk 71 are located around the buildings 81, 82. In response to a request from a user 31 at the building 81 at 9:00 (present time) to deliver a package to a user 32 at the building 82, the common server 10 searches the vehicle 50 which is located near the user 31, based on the positional information received from a mobile terminal 31a of the user 31. As shown in FIG. 4, the common server 10 sends a package collect-and-deliver command to the vehicle m1 which is traveling on the roadway 70 near the building 81. Simultaneously, the common server 10 sends data, to the vehicle m1; namely, the current positional information of the user 31, the position information of the user at the building 81, map information around the building 81, and indoor layout information of the building 81. The common server 10 also sends delivery destination information to the vehicle m1. As shown in FIG. 2, the common server 10 stores, in a data set of the vehicle m1 in the operation status data 141, "delivery 101" in the task identification column; "collection in progress" in the progress column; "9:00" (present time) in the start time column; and "10:00" (scheduled finish time) in the finish time column.

Based on the received data from the common server 10, the vehicle m1 obtains a route to the user 31 and autonomously travels to the user 31 in accordance with the obtained route. When the vehicle m1 reaches the user 31, the user 31 places a package 35 on the vehicle m1. After confirming the receipt of the package 35, the vehicle m1 starts autonomous driving to the delivery destination. As shown in FIG. 4, the vehicle m1 autonomously travels out of the building 81 onto the roadway 70 toward the building 82. At this stage, the vehicle m1 receives indoor layout data of the building 82 from the common server 10. Then, the vehicle m1 autonomously travels into the building 82 and to the user 32 at the building 82 while receiving the positional information of a mobile terminal 32a of the user 32. The vehicle m1 finishes the delivery task 101 when the user 32 receives the package 35. The vehicle m1 returns to the nearest station to stand by when no next package collect-and-deliver command is received from the common server 10, whereas the vehicle m1 autonomously travels to the next user 30 when a next package collect-and-deliver command is received from the common server 10. Other vehicles m2 to mn perform delivery tasks in a manner similar to the vehicle m1.

Figure 5:
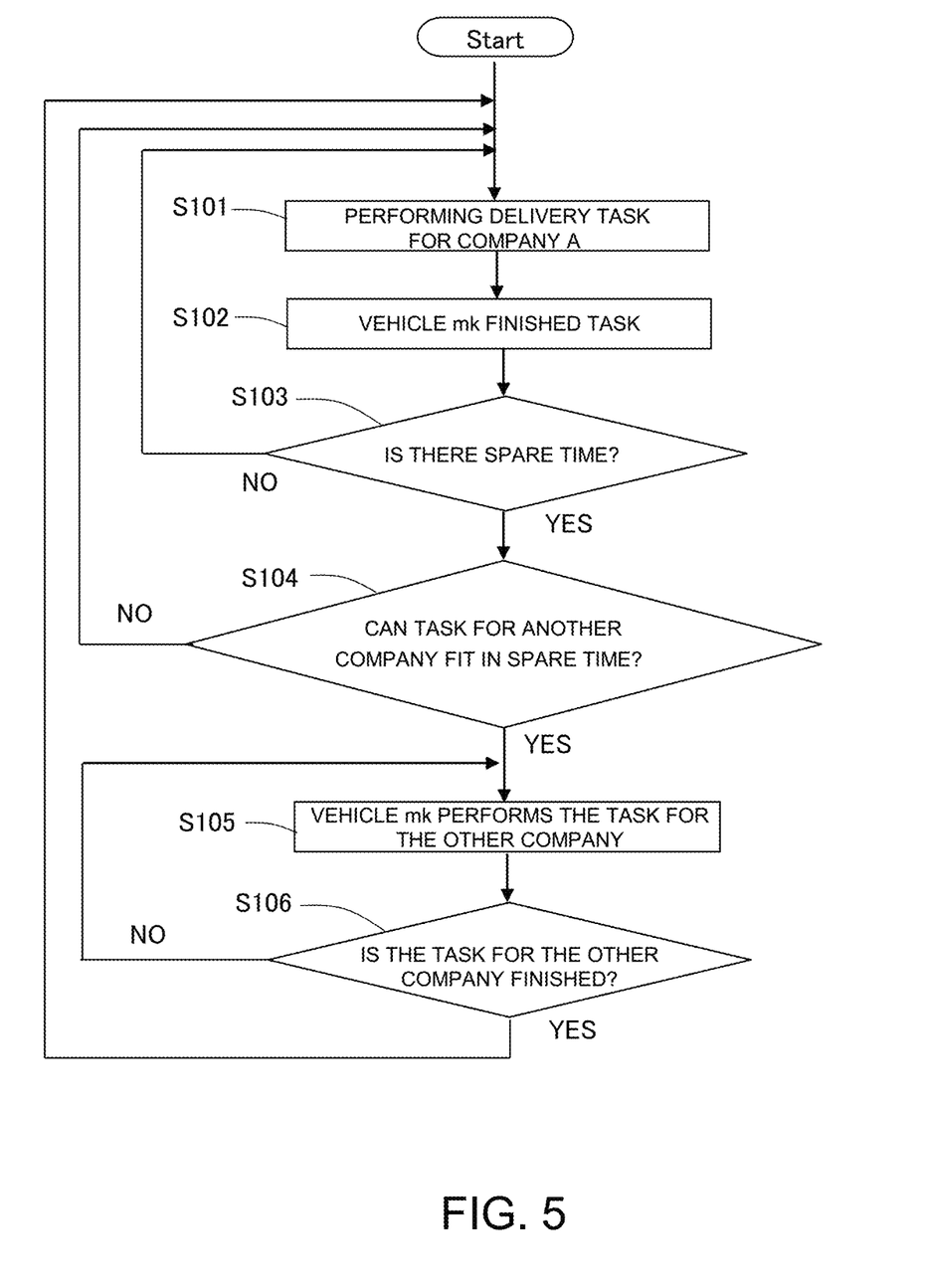
FIG. 5 is a flowchart showing operations of a common server in the service system shown in FIG. 1.
Figure 6:
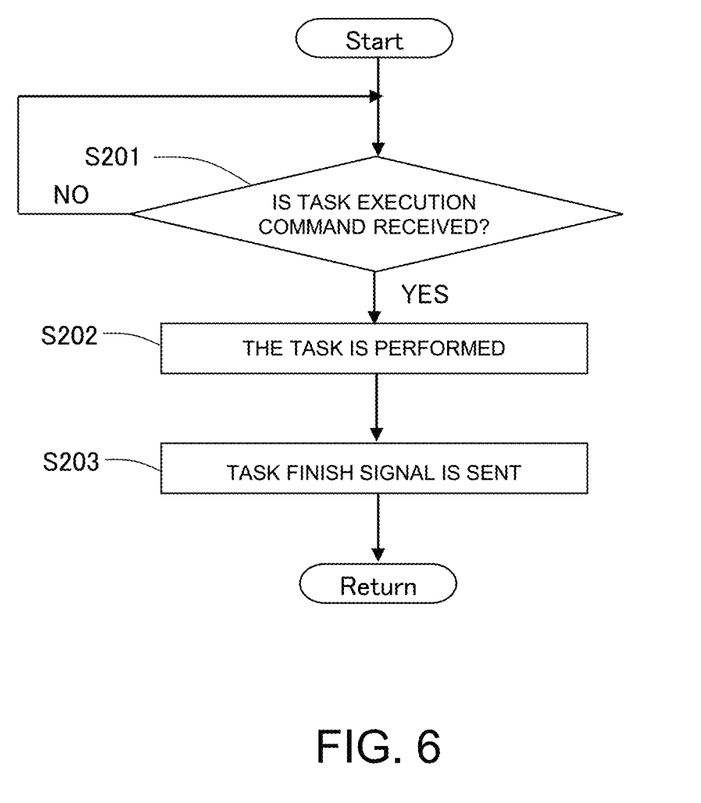
FIG. 6 is a flowchart showing operations of a vehicle in the service system shown in FIG. 1.

With reference to FIGS. 5 and 6, there will be described operations of the vehicles 50 cooperating with the common server 10 to perform housekeeping services for the company B 21 and the company C 22, which are other entities.

In step S101 in FIG. 5, the common server 10 performs a delivery task for the company A 20 as described above with reference to FIG. 4 by cooperating with vehicles m1 to mn. As shown in FIG. 6, in response to a package collect-and-deliver command as a task execution command received from the common server 10 in step S201, the vehicles m1 to mn perform the delivery task in step S202 in accordance with the command, and the vehicles m1 to mn send a task finish signal to the common server 10 in step S203 when the delivery task is finished.

In response to receipt of the task finish signal from the vehicle mk which is one of the vehicles m1 to mn in step S102 in FIG. 5, the common server 10 proceeds to step S103 in FIG. 5 and accesses the operating status data 141 in the operating status database 14 to find, from the vehicles m1 to mn, any vehicle mm which has any spare time for performing a task.

For example, assuming that the present time is 10:00, when the task finish signal is sent from the vehicle m1, the common server 10 accesses the operating status data 141 shown in FIG. 2 and finds that the vehicle m1 has spare time from 10:00 to 11:00 because the next delivery task of the vehicle m1 is scheduled to start at 11:00. Then, the common server 10 proceeds to step S104 in FIG. 5. The common server 10 checks the spot task progress data 142 shown in FIG. 3 to compare the spare time of the vehicle m1 and the registered time required for the spot task requested by another company. As shown in FIG. 3, because the time required for the shopping task 102 from 10:05 to 10:20 requested by the company B 21 can be fit within the spare time of the vehicle m1, the common server 10 determines "YES" in step S104 in FIG. 5 and proceeds to step S105. In step S105, the common server 10 uses the vehicle m1 to perform the shopping task 102 requested by the company B 21 from 10:05 to 10:20 by sending a task execution command of the shopping task 102 to the vehicle m1. In this operation, the common server 10 also sends, to the vehicle m1, other data such as map information data required for performing the shopping task 102. In response to receipt of the task execution command, the vehicle m1 determines "YES" in step S201 in FIG. 6 and proceeds to step S202 to perform the task. Then, when finishing the shopping task 102, the vehicle m1 sends a task finish signal to the common server 10 in step S203 in FIG. 6. In response to receipt of the task finish signal from the vehicle m1, the common server 10 determines "YES" in step S106 in FIG. 5 and returns to step S101 to perform a task for the company A 20 which is the primary entity.

As described above, because, in a service system 100 according to an embodiment of the present disclosure, the multiple vehicles 50 can be allocated to perform different types of tasks of multiple entities which provide different types of businesses, the operation efficiency of the vehicles 50 can be improved. Because the vehicles 50 can deliver packages or provide housekeeping services from a location at a building to a destination at another building via outside road without interruption ("one-through" operation), various services can be provided efficiently. Further, because tasks of entities other than the primary entity are performed in spare time of the tasks of the primary entity, the operation efficiency of the vehicles 50 can be improved without interrupting with tasks of the primary entity.

Although the company B 21 and the company C 22 are described above as entities which provide housekeeping services, the present disclosure is not limited to these embodiments. For example, the entities may be security companies which provide patrol services in managed areas. In such a case, the vehicles 50 with monitoring cameras may perform the patrol service in the managed areas as a spot task. In another example where the entities are local governments and the tasks are to collect garbage in managed areas, the vehicles 50 may perform the garbage collecting tasks as spot tasks by arranging the package container of the vehicle 50 to contain garbage.

The invention claimed is:
1. A service system comprising:
a common server comprising a map information database storing map data; and
a plurality of vehicles in communication with the common server to travel autonomously;
wherein each of the plurality of vehicles performs tasks of a plurality of entities by cooperating with the common server,
the common server further comprises an operating status database in which an operating status of each of the plurality of vehicles and a primary entity which has priority to use all or part of the plurality of vehicles are associated with each other,
when one of the plurality of vehicles finishes a task of the primary entity, the common server determines whether the vehicle can perform another task of an entity other than the primary entity by checking the operating status database, and if determining so, performs the task of the other entity by cooperating with the vehicle, and
when the one of the plurality of vehicles finishes the task of the primary entity, the common server determines whether the vehicle can perform another task of the other entity by comparing a spare time duration allowed before a next task of the primary entity and a required time duration to perform the other task of the other entity.

2. The service system according to claim 1, wherein
the common server further comprises a building database that stores indoor data of a building, and
the plurality of vehicles autonomously travel inside and outside the building based on the indoor data of the building and the map data received from the common server.

3. The service system according to claim 1, wherein
the entities other than the primary entity provide services different from that of the primary entity.

4. The service system according to claim 2, wherein
the entities other than the primary entity provide services different from that of the primary entity.

* * * * *